INVENTORS
WILLIAM B. HANSEL
JAMES L. LAUER
BY
*Donald R. Johnson*
ATTORNEY

INVENTORS
WILLIAM B. HANSEL
JAMES L. LAUER
BY Donald R. Johnson
ATTORNEY

United States Patent Office 3,307,917
Patented Mar. 7, 1967

3,307,917
WAVE REACTOR
William B. Hansel, Media, Pa., and James L. Lauer, La Jolla, Calif., assignors to Sun Oil Company, Philadelphia, Pa., a corporation of New Jersey
Filed Feb. 4, 1965, Ser. No. 430,412
10 Claims. (Cl. 23—284)

This invention relates to a chemical reactor wherein certain endothemic chemical reactions may be carried out by subjecting a reactant material to one or more mechanical shock waves, thereby to produce a high temperature in such material for a very short period of time. Such a reactor may be thought of as a wave reactor.

The present invention represents an improvement over that disclosed in the copending Bodmer application, Serial No. 349,884, filed March 6, 1964 and now Patent No. 3,262,757.

The wave reactor of this invention may be used for many different chemical reactions. For illustrative purposes, however, it will be described in connection with the preparation of hydrogen cyanide and acetylene, using carbonaceous, hydrogenous, and nitrogenous material (e.g., a mixture of methane and nitrogen) as the reactant material.

An object of this invention is to provide a novel wave reactor construction.

Another object is to provide an improved chemical reactor by means of which endothermic reactions can be carried out efficiently and economically.

A further object is to provide a wave reactor whose characteristics may be readily adjusted for experimental purposes, and which provides a convenient sampling arrangement.

In brief, a straight elongated shock tube rotates in a vertical plane within a port ring which, according to the present invention, has a plurality of radially-extending holes drilled therethrough. By means of such holes, as well as other ports provided in the ring, gases may be fed to and from the shock tube. A pair of arcuate manifolds may be secured to the port ring, radially outwardly thereof, to provide a pair of chambers coupled to the port ring holes, to which chambers lines or conduits may be connected. At least one of these manifolds may have radial holes therein respectively aligned with the port ring holes, and through these manifold holes plugs can be inserted to close off selected holes in the port ring, or sampling tubes can be inserted through these manifold holes and through the aligned port ring holes to draw a sample out of the device.

A detailed description of the invention follows, taken in conjunction with the accompanying drawings, wherein.

It has been found that it is possible to convert natural gas (methane) into acetylene, or mixtures of natural gas and nitrogen into hydrogen cyanide and acetylene, by heating the reagents quickly to temperatures above 3500° F., the heating to be almost immediately followed by cooling to a temperature not substantially greater than 1600° F., the cooling rate being comparable to the heating rate. More specifically, a mixture of equal parts by volume of nitrogen and methane can be converted to a mixture consisting of acetylene (12% by volume), hydrogen cyanide (5%), hydrogen (45%), nitrogen (33%), and methane (5%), at a power plus heat cost of 2.2¢ per pound of acetylene-hydrogen cyanide mixture.

The required heating and cooling may be conveniently effected in a shock tube. A shock tube is a pipe in which a gas or a gas mixture (termed the process gas) can be heated very rapidly to very high temperatures by another gas, the driving gas, adiabatic compression being the heating mechanism. That is to say, the process involves adiabatic compression of the process gas by another gas, the driving gas, which latter works in a way similar to a mechanical piston. The heating is followed almost immediately by rapid cooling through expansion. If there is a sequence of equivalent independent shock tube processes, the result is essentially a continuous flow process.

The gas or mixture of gases which is acted upon in the shock tube may be termed the reagents, a process gas, a reactant mixture, a charge gas, a reactant material, or a process mixture.

Figure 1:
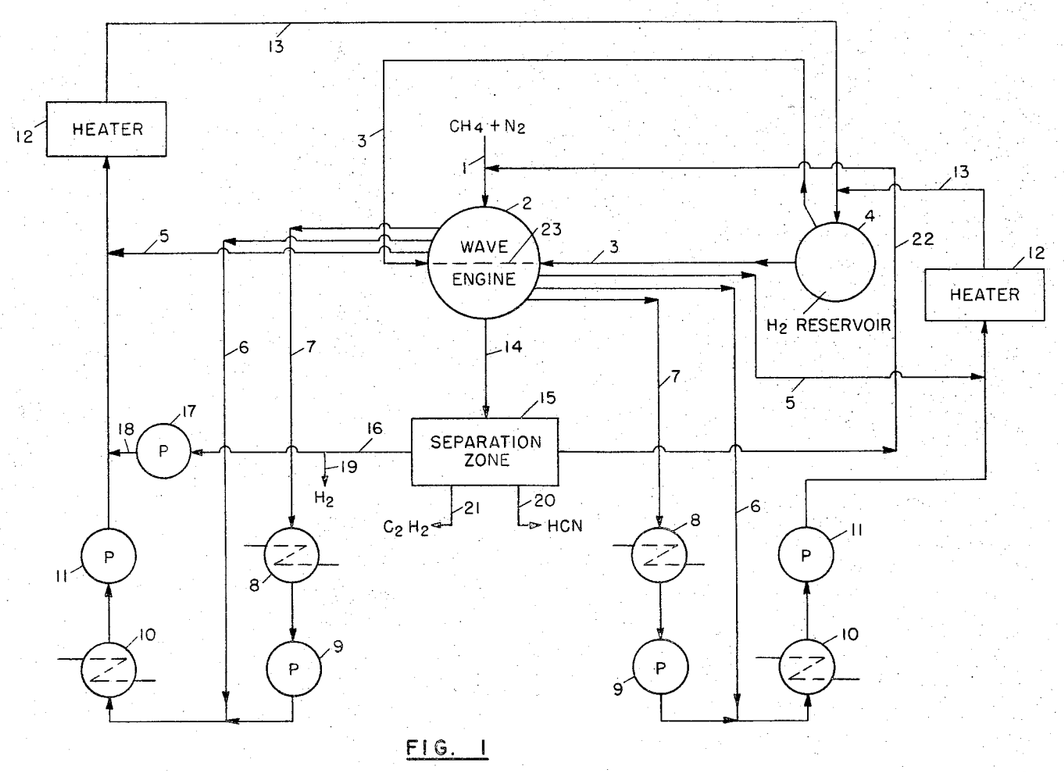
FIG. 1 is a schematic flow diagram of a wave reactor system set up for the preparation of hydrogen cyanide and acetylene from methane and nitrogen.

Referring now to FIG. 1, a mixture of equal parts by volume of nitrogen and methane (natural gas), at atmospheric pressure and about 890° F., is introduced through line 1 (which may be a manifolded conduit) into a wave reactor 2, which is of generally circular configuration. As subsequently more fully described, one side of the wave reactor receives reactant material, diametrically-opposite sides receive driving gas, from diametrically-opposite sides driving gas is withdrawn, and from one side reaction products are withdrawn. The same numerals are employed at diametrically-opposite sides to designate conduits and apparatus which correspond in function. It is to be understood that in many cases a single piece of apparatus can be substituted for the corresponding two pieces of apparatus having the same function, and in this case certain materials introduced into and withdrawn from the wave reactor (to wit, the driving gas) can be suitably manifolded to the substituted single piece of apparatus. However, for purposes of clarity, the respective pieces of apparatus are duplicated at diametrically-opposite sides of the wave reactor.

A driving gas, for example hydrogen at about twenty-two atmospheres absolute and 1040° F., is suddenly introduced through the lines 3 from a hydrogen reservoir 4 into diametrically-opposite sides of the wave reactor 2. Shock waves are thereby created in the reaction tube of the wave reactor, in a manner which will be described more fully subsequently. The methane and nitrogen are adiabatically compressed, with a resulting rapid increase in temperature (to a temperature above 3500° F.). At this rather high reaction temperature, the methane and nitrogen react to form hydrogen cyanide and acetylene, with hydrogen as a byproduct. The following two chemical reactions may occur in the wave reactor:

and

After the adiabatic compression process is complete, a portion of the driving gas is removed from diametrically-opposite sides of the wave reactor through the lines 5, at about twenty-two atmospheres and 1090° F. Subsequently, a second portion of the driving gas is withdrawn from diametrically-opposite sides of the wave reactor through the lines 6, at about seven atmospheres and 645° F. Subsequently, the remainder of the driving gas is withdrawn from diametrically-opposite sides of the wave reactor through the lines 7 at about two atmospheres and 330° F.

The last portion of the driving gas is cooled by passage through coolers 8 to reduce the temperature to about 140° F. This portion of the driving gas is then compressed to about seven atmospheres by passage through compressors 9. The resulting driving gas is admixed with the driving gas removed through line 6, and the mixture is cooled in coolers 10 to a temperature of about 140° F. The cooled gas is compressed in compressors 11 to about twenty-two atmospheres, and is admixed with the driving gas removed through line 5. The mixture is introduced into the heaters 12, wherein it is heated to about 1040° F. The heated driving gas at about twenty-two atmospheres is supplied through lines 13 to the reservoir 4.

Following the removal of the driving gas from the respective opposite sides of the wave reactor, the reaction products, together with unreacted methane and nitrogen, are withdrawn from the wave reactor through the line 14 (which may be a manifolded conduit) as effluent gas, at about 1540° F. and 0.5 atmosphere. The material withdrawn via line 14 is introduced into a separation zone 15 wherein a plurality of operations are carried out to obtain the respective constituents in purified form. Hydrogen, which was formed in the aforementioned chemical reactions, is separated by known means, such as diffusion through a palladium tube, and is removed through line 16. A portion of the removed hydrogen can be compressed in the compressor 17 to about twenty-two atmospheres and introduced through the line 18 into one of the heaters 12, and then recycled to the wave reactor. The remainder of the product hydrogen is withdrawn via line 19 as a product of the process.

Hydrogen cyanide is separated from the remaining product gases by scrubbing with an alkaline medium, or by other known separation procedures. This gas is withdrawn via line 20 as another product of the process. After separation of the hydrogen cyanide, acetylene is separated from the remaining gases by absorption in a copper-salt solution, or by other known means for separating acetylene from gaseous mixtures. Acetylene is withdrawn via line 21 as another product of the process. The remaining (unreacted) methane and nitrogen are recycled to the wave reactor 2 through line 22, which couples into line 1.

The exhaust of reaction products via line 14 may be taking place simultaneously with the intake of reactant material via line 1. This intake of new reactant material flushes out, from the reactor, the products produced during a previous operation.

In the wave reactor, gas flows through a straight tube (to wit, the shock tube) and is considered one dimensional. The axis of this tube is indicated by the dotted line 23 in FIG. 1. In a mechanical model to be now referred to, gas in a straight tube is represented by a row of marbles which can move along a straight line. The spacing between the marbles is a measure of the gas pressure; the smaller the spacing, the higher the pressure. Assume that a straight tube, closed at each end, contains process gas (methane-nitrogen mixture) at approximately atmospheric pressure and at 890° F. How the process gas is admitted to this tube is of no concern at the moment. This situation is illustrated in FIG. 2, where the process gas is represented by a number of black marbles equally spaced in the top horizontal row, labeled "Initial State."

Next assume that both ends of the tube are suddenly opened simultaneously and connected to the reservoir containing hydrogen at 22.1 atmospheres and 1040° F. The hydrogen, being at an elevated pressure, will begin to enter the tube from both ends and push the process gas toward the middle. The push exerted by the hydrogen on the process gas compresses the latter and imparts a flow speed on it directed toward the middle of the tube.

Figure 2:
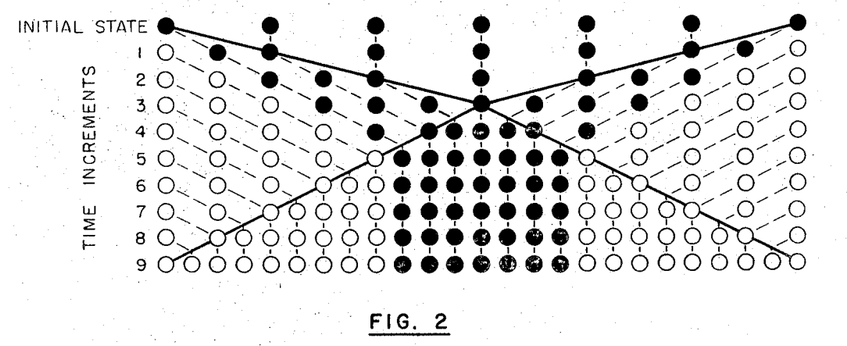
FIGS. 2 and 3 are position-time diagrams of a mechanical model, illustrating certain actions occurring in a shock tube.

This is illustrated in FIG. 2, where the hydrogen is represented by white marbles. The second horizontal row from the top represents the situation after a first time increment; one white marble has entered the tube and displaced the first black marble. The spacing between the first two black marbles is reduced, indicating an increase in pressure. After a further time increment, two white marbles have entered the tube, as shown in the third horizontal row from the top. The first two black marbles have been displaced, and the spacing between the first three black marbles is reduced. Subsequent horizontal rows illustrate the situation after subsequent time increments.

The paths of the respective marbles are indicated by broken lines. The third black marble, for instance, remains at rest for two time increments, and then begins to move. Note that the process gas and the hydrogen move at the same speed and are at the same pressure level, as indicated by equal spacing of the black and white marbles.

Consider now the situation after the first time increment. The spacing between the first and second black marbles is different from the spacing between the second and third black marbles; i.e., a pressure discontinuity exists at this point in the tube. After the second time increment, the pressure discontinuity has moved to the third black marble. Ahead of this moving pressure discontinuity, the gas is at low pressure and at rest; behind it the gas moves and is at elevated pressure. Such a discontinuity is called a shock wave. The progressions of the two shock waves (one starting from each end of the tube) through the tube are shown as solid lines in FIG. 2. Note that they move with a higher speed than the particle speed behind them.

After the third time increment, the two shock waves which emanate from the two tube ends meet in the middle and cross. By this crossing the action is changed. That is to say, ahead of the wave the gas flows and is at elevated pressure, while behind the wave the gas is at rest and even higher pressure, the latter being illustrated by even closer spacing of the marbles. After the fifth time increment, the shock waves enter the hydrogen, bringing it to rest and compressing it to the same pressure as the process gas.

After nine time increments, the shock waves have traveled through the entire tube length. At this point, both tube ends are closed again and the compression process is complete.

The tube now contains, for every pound of process gas, 2.2 pounds of hydrogen at a pressure of about forty atmospheres. The process (now product) gas is at 3200° F., the hydrogen at 1380° F. The flow speed reached in the tube is 5600 feet per second, corresponding to Mach numbers of 0.82 and 1.86 for the hydrogen and the process gas, respectively.

The time used for the complete compression process is equal to the time it takes for a shock wave to travel through the tube. For a tube length of twelve inches, with a wave speed of 5600 feet per second, this is about 0.18 millisecond.

The desire is to reach a given temperature with a minimum pressure (in order not to inhibit the chemical process) and with a minimum of irreversibilities. In this connection, it is pointed out that shock waves are irreversible processes, i.e., a loss of mechanical energy occurs.

Figure 3:
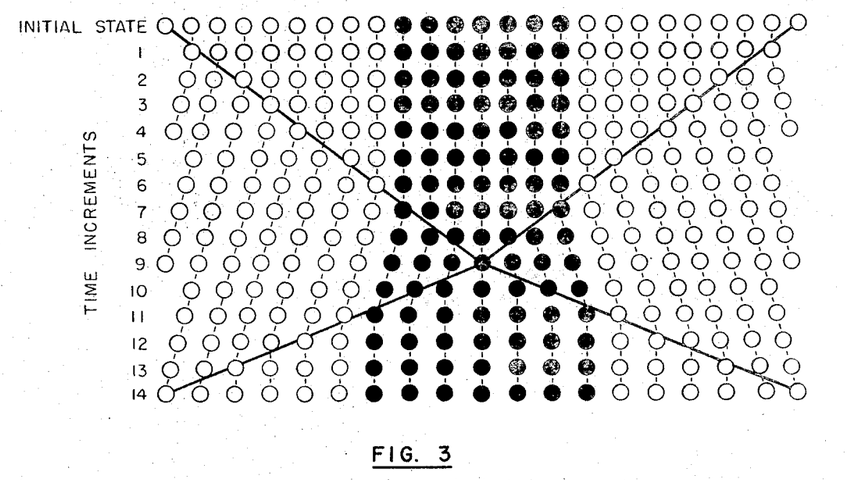

After completion of the compression process, the tube contains a charge of product gas and hydrogen at high pressure, with both tube ends being closed. See the bottom row in FIG. 2, which corresponds to the top or first row in FIG. 3. The latter is labeled "Initial State," since it is the initial state in the expansion process, now to be described. The expansion process is begun by the simultaneous opening of both tube ends to spaces of a pressure below the pressure in the tube. Hydrogen will begin to flow out of the tube, as illustrated in FIG. 3. The second row of marbles in this latter figure illustrates the situation after some time increment; one white marble has left the tube, indicating a drop in pressure. Subsequent rows show the situation after subsequent time increments.

As in the case of the compression process, there is at each time increment one marble with different spacings on the two sides thereof; i.e., a pressure discontinuity exists. The two discontinuities (one starting from each end of the tube) move through the tube, as shown in FIG. 3 by solid lines. During the first nine time increments the pressure ahead of this discontinuity is at the original level; behind it the pressure has fallen and the gas moves. Such a discontinuity is called an expansion wave.

After nine time increments, the two expansion waves emanating from the respective ends of the tube meet and cross. By this crossing, the situation is changed in the sense that, now, ahead of the wave the gas is at reduced pressure and moves, while behind the wave the gas is at even further reduced pressure and at rest. In FIG. 3, after fourteen time increments the expansion waves have traveled the entire length of the tube; at this point the tube ends are closed. Now, the tube contains the original quantity of product gas, plus a fraction of the hydrogen which originally entered the tube; these contents are at a reduced pressure. This process is repeated two more times, the tube ends being opened each time to spaces of lower pressure. Thus, a total of three expansion stages are employed. These are indicated at 5, 6, and 7 in FIG. 1. At the end of the third expansion stage, all the hydrogen has left the tube. After the third expansion stage, there is an expansion and discharge stage, during which effluent gas is discharged. This is indicated at 14 in FIG. 1. The cooling of the effluent gas from 3200° F. to about 1500° F. involves a pressure decrease of 80:1. Thus, the final effluent gas pressure at the end of this last-mentioned stage is about 0.5 atmosphere.

A summary of the operation of the wave reactor of this invention will now be given. Refer again to FIG. 1. A straight open-ended tube, having a length substantially equal to the diameter of the circle at 2 (and whose axis is indicated by the dotted line 23), rotates (at high angular velocity) in the plane of the paper, about an axis coinciding with the center of the circle. The ends of such a tube would thus rotate past the ends of the various lines and conduits shown schematically in FIG. 1. As one end of the tube rotates past the end of line 1, process gas is admitted to the tube. At this same time, the other end of the tube may be rotating past the end of line 14, thereby discharging (flushing) product gases from the tube. When the opposite ends of the tube thereafter come into alignment with the ends of lines 3 (this is the position illustrated in FIG. 1), both ends of the tube are thereby suddenly connected to the reservoir 4, which contains the high pressure driving gas, hydrogen. The hydrogen enters the tube with high velocity from both ends, creating two shock waves (as described in connection with FIG. 2) which push the process gas (already in the tube) toward the middle. This adiabatic compression compresses the process gas and brings it very rapidly to the reaction temperature, not less than 3200° F. The two shock waves, emanating from the tube ends, eventually meet in the middle and cross. When the two shock waves have traveled through the entire tube length, the compression process is complete. This was previously described in connection with FIG. 2.

After completion of the compression process, the tube contains a charge of process (now product) gas and hydrogen at high pressure, with both tube ends being closed (since, by this time, the ends of the tube have completed their travel past the ends of lines 3).

Following the compression process, both ends of the tube come into alignment with the ends of lines 5; this means that both such ends simultaneously become open to spaces of a pressure below the pressure in the tube. Now, hydrogen begins to flow out of the tube, setting up expansion waves which emanate from the respective ends of the tube. The expansion described begins to rapidly reduce the temperature and pressure of the product gas. The two expansion waves, emanating from the two tube ends, eventually meet in the middle and cross. When the two expansion waves have traveled through the entire tube length, the first expansion process is complete. This was previously described in connection with FIG. 3.

After completion of the first expansion process, the tube contains the original quantity of product gas, plus a fraction of the hydrogen which originally entered the tube; these contents are at a reduced pressure. At this point, both tube ends are closed, the ends of the tube having completed their travel past the ends of lines 5.

The expansion process described is repeated two more times, the tube ends being opened each time to spaces of progressively lower pressure (to wit, first the ends of lines 6 and then the ends of lines 7). Thus, a total of three expansion stages are employed. At the end of the third expansion stage, all the hydrogen has left the tube.

After the third expansion stage, there is an expansion and discharge stage, during which effluent gas is discharged; this expansion and discharge occurs during the time that one end of the tube is in communication with the end of line 14. At this same time, process gas may be entering the other end of the tube, via line 1, to begin the next cycle of operation of the wave engine and to flush out the products from the previous cycle, via line 14.

A detailed description of the construction of wave reactor 2 will now be given, with reference to FIGS. 4–10. A stationary port ring 24 is mounted in a position wherein its longitudinal axis extends substantially horizontally, and its two parallel annular faces (to wit, its front and rear faces 25 and 26, respectively, see FIG. 9) lie in parallel vertical planes. By way of example, port ring 24 may have a thickness in the axial direction of one inch, an I.D. of twelve inches, and an O.D. of 14½ inches. Ring 25 has therein a pair of diametrically-opposite, radially-extending apertures 27 which are centered on the respective opposite ends of its central horizontal diameter. Apertures 27 are approximately rectangular in outline, but have arcuate upper and lower boundaries (see FIG. 7). The longer dimension (e.g., this may be 1⅜ inches) of these approximately rectangular apertures 27 extends vertically in the plane of the paper in FIGS. 4 and 7, while the shorter dimension (e.g., this may be about 9/16 inch) extends horizontally in the plane of the paper in FIG. 7. Apertures 27 are the apertures for the driving gas (hydrogen) supply nozzles.

In each of the apertures 27, there is mounted a respective nozzle 28. These nozzles have at their inner ends a rectangular cross-section with inside dimensions about ¼ inch by 1 inch, they open into the interior of the port ring 24, and they are cut off at their inner ends on a twelve-inch diameter arc, to match the curvature of the I.D. of ring 24. Toward their outer ends, each of the nozzles 28 is provided with a respective mechanical assembly which enables the nozzles to be adjusted longitudinally, in their respective apertures 27, over a small range (e.g., .01 inch). Such assemblies are not shown completely herein, since they form no part of the present invention; they are disclosed and claimed in the copending application, Serial No. 334,523, filed December 30, 1963, now Patent No. 3,263,645. Such assemblies may each include an externally-threaded flange 29 secured as by welding at 30 to the outer face of ring 24, and a housing 31 having female threads at one end thereof which mate with the threads of flange 29.

The outer ends of nozzles 28 are coupled to respective ones of the lines 3 (see FIG. 1), which in turn extend to the hydrogen (driving gas) reservoir 4. Thus, by means of the nozzles 28, the driving gas is fed to diametrically-opposite areas of the interior of ring 24, that is, to diametrically-opposite sides of the wave reactor.

Figures 4, 8, 10:
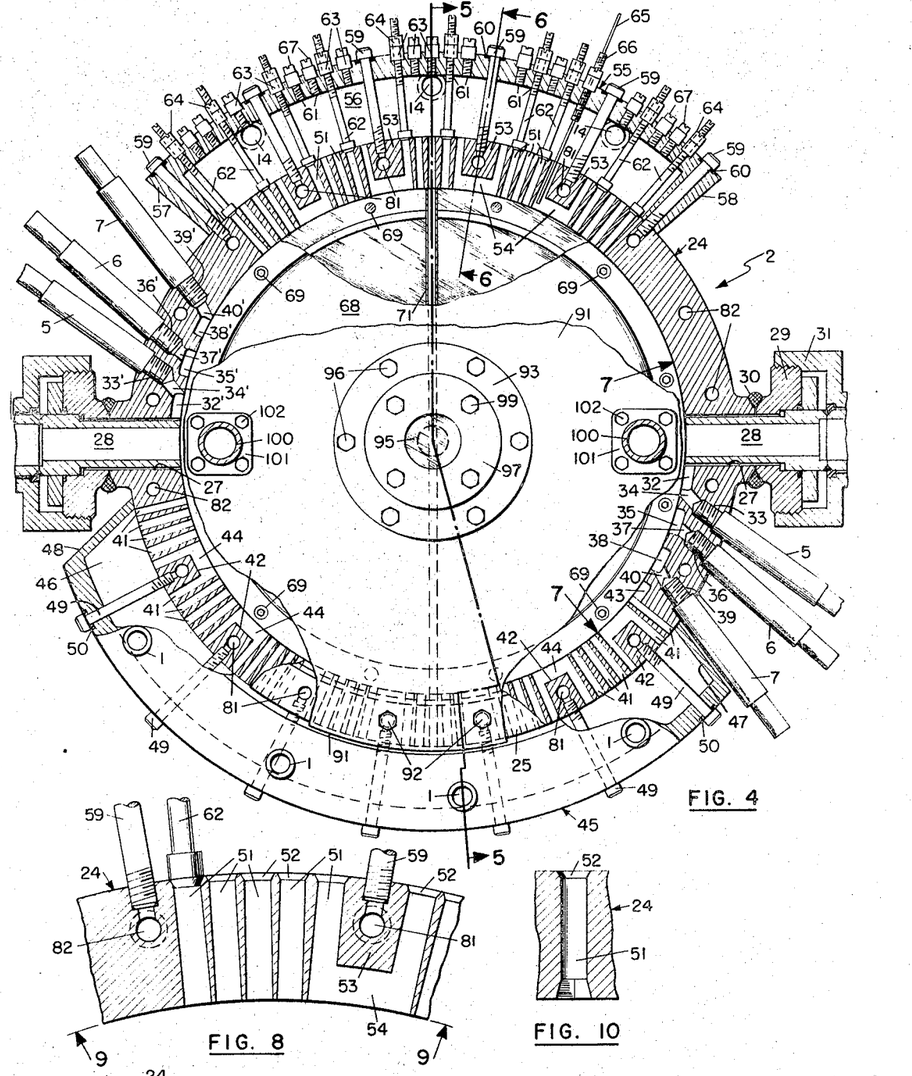
FIG. 4 is a front elevation of a wave reactor according to this invention, certain parts being peeled away to show the interior thereof.
FIG. 8 is a portion of FIG. 4 drawn on an enlarged scale.
FIG. 10 is a section taken on line 10—10 of FIG. 9.
Figures 5, 6, 7:
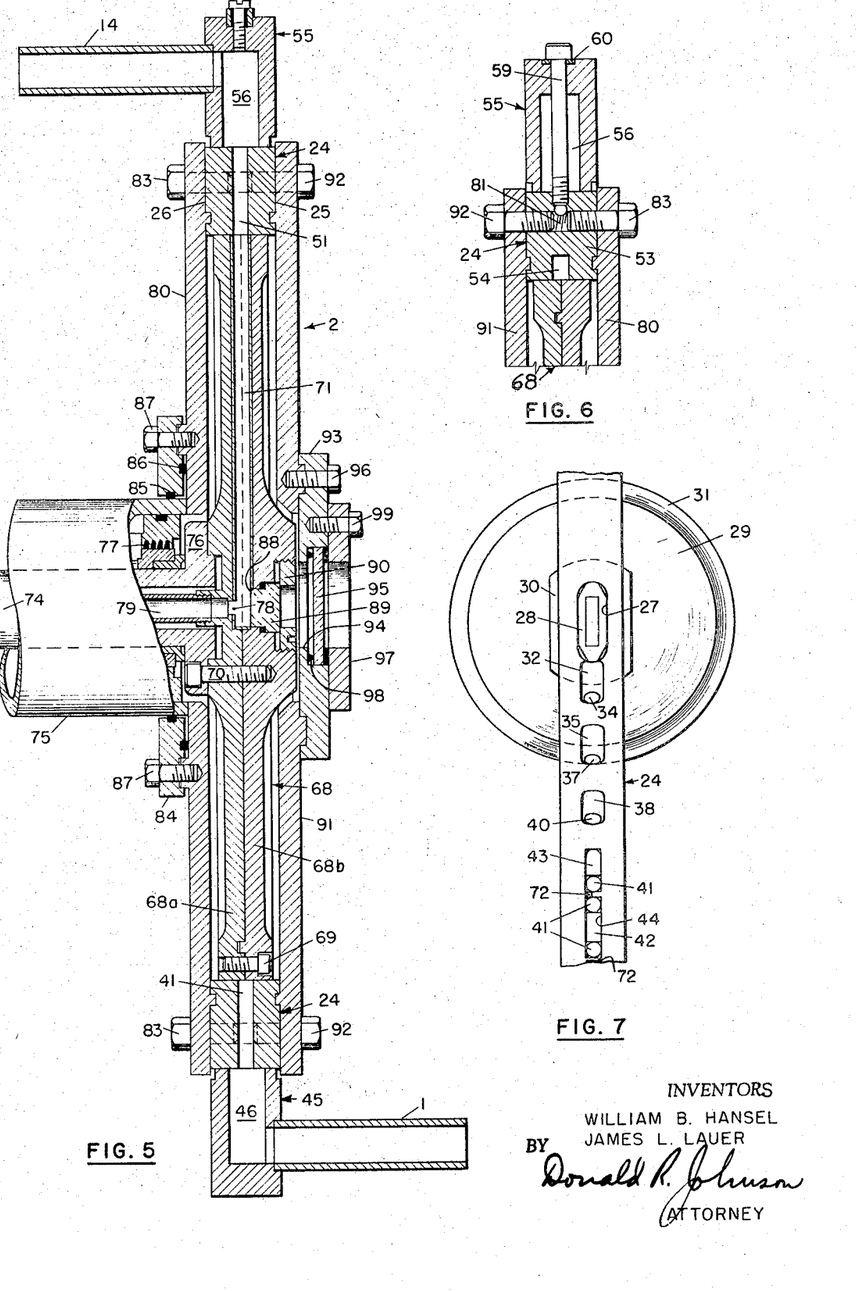
FIG. 5 is an essentially vertical section, taken on line 5—5 of FIG. 4.
FIG. 6 is a partial section, taken on line 6—6 of FIG. 4.
FIG. 7 is a face view, looking at the inner surface of the port ring, in the direction of arrows 7—7 in FIG. 4.

Immediately adjacent the right-hand one of the apertures 27, in the clockwise direction (when looking at the wave reactor from the front thereof, as in FIG. 4), a pocket or recess 32 is cut into the inner cylindrical surface of ring 24, this pocket, like apertures 27, being centered along the axial dimension of ring 24 (see FIG. 7). From the outer face of ring 24, closely adjacent the location of recess 32, a tapped hole 33 extends into ring 24 to a certain depth, and from the bottom of hole 33 a hole 34 extends into communication with recess 32. Thus, the combination of items 32, 34, and 33 provides a port which extends entirely through ring 24, in an approximately radial direction, from the interior to the exterior thereof. One of the lines 5 has a threaded fitting on its inner end which threads into tapped hole 33; the opposite end of this line 5 is coupled into the line leading into one of the heaters 12, as previously described in connection with FIG. 1. This line 5 thus serves as a first-stage coupling for removing driving gas from the interior of ring 24, at one side of the wave reactor (to wit, the right-hand side in FIG. 4).

Diametrically opposite to pocket or recess 32, a similar pocket 32' is cut into the inner surface of ring 24, this latter pocket communicating by way of a hole 34' with the inner end of a tapped hole 33' into which threads a threaded fitting provided on the inner end of the other line 5. The combination of items 32', 34', and 33' provides a port which extends entirely through ring 24, in an approximately radial direction, diametrically opposite to the port provided by 32, 34, and 33. The remote end of this other line 5 is coupled into the intake line of the other heater 12, as previously described. This other line 5 thus serves as a first-stage coupling for removing driving gas from the interior of ring 24, at the other side of the wave reactor (to wit, the left-hand side in FIG. 4).

Slightly clockwise (when viewed in FIG. 4) from pocket 32, a pocket or recess 35 is cut into the inner cylindrical surface of ring 24, this pocket also being centered along the axial dimension of ring 24, and, like pocket 32, being substantially rectangular in outline. From the outer face of ring 24, closely adjacent the location of recess 35, a tapped hole 36 extends into ring 24 to a certain depth, and from the bottom of hole 36 a hole 37 extends into communication with recess 35. The combination of items 35, 37, and 36 provides a port which extends entirely through ring 24, in an approximately radial direction, from the interior to the exterior thereof. One of the lines 6 has a threaded fitting on its inner end which threads into tapped hole 36; the opposite end of this line 6 is coupled into the line leading into one of the heaters 10, as previously described in connection with FIG. 1. This line 6 thus serves as a second-stage coupling for removing driving gas from the interior of ring 24, at one side of the wave reactor (to wit, the right-hand side in FIG. 4).

Diametrically opposite to pocket or recess 35, a similar pocket 35' is cut into the inner surface of ring 24, this latter pocket communicating by way of a hole 37' with the inner end of a tapped hole 36' into which threads a threaded fitting provided on the inner end of the other line 6. The combination of items 35', 37', and 36' provides a port which extends entirely through ring 24, in an approximately radial direction, diametrically opposite to the port provided by 35, 37, and 36. The remote end of this other line 6 is coupled into the intake line of the other heater 10, as previously described. This other line 6 thus serves as a second-stage coupling for removing driving gas from the interior of ring 24, at the other side of the wave reactor (to wit, the left-hand side in FIG. 4).

Slightly clockwise (viewed in FIG. 4) from pocket 35, a pocket or recess 38 is cut into the inner cylindrical surface of ring 24, this pocket also being centered along the axial dimension of ring 24, and being substantially rectangular in outline. From the outer face of ring 24, closely adjacent the location of recess 38, a tapped hole 39 extends into ring 24 to a certain depth, and from the bottom of hole 39 a hole 40 extends into communication with recess 38. The combination of items 38, 40, and 39 provides a port which extends entirely through ring 24, in an approximately radial direction, from the interior to the exterior thereof. One of the lines 7 has a threaded fitting on its inner end which threads into tapped hole 39; the opposite end of the line 7 is coupled to the intake of one of the heaters 8, as previously described in connection with FIG. 1. This line 7 thus serves as a third-stage coupling for removing driving gas from the interior of ring 24, at one side of the wave reactor (to wit, the right-hand side in FIG. 4).

Diametrically opposite to pocket or recess 38, a similar pocket 38' is cut into the inner surface of ring 24, this latter pocket communicating by way of a hole 40' with the inner end of a tapped hole 39' into which threads a threaded fitting provided on the inner end of the other line 7. The combination of items 38', 40', and 39' provides a port which extends entirely through ring 24, in an approximately radial direction, diametrically opposite to the port provided by 38, 40, and 39. The remote end of this other line 9 is coupled to the intake of the other heater 8, as previously described. This other line 7 thus serves as a third-stage coupling for removing driving gas from the interior of ring 24, at the other side of the wave reactor (to wit, the left-hand side in FIG. 4).

According to this invention, it has been found that, when using the wave reactor construction disclosed in the aforementioned application Serial No. 349,884 (wherein arcuately-elongated recesses, each coupled to one or more pipes, are provided in the radially-inner surface of the port ring), eddy currents are sometimes set up in the gases passing through these recesses and pipes. It is desirable to eliminate such eddy currents, and this is done according to this invention by utilizing, instead of the recesses, a plurality of small, closely adjacent (but separated from each other) passages through the port ring, the outer ends of the individual small passages being coupled together by means of a manifold which is outside the port ring. These small passages through the port ring comprise radially-extending holes drilled entirely through the ring, in the radial direction. The use of these holes provides another advantage which will be described later. This construction will now be described.

The intake (or reactant feed) portion of the port ring 24 (to which the reactant material feed line 1, FIG. 1, is coupled) may be considered as beginning at a point slightly (angularly) clockwise (viewed in FIG. 4) from pocket 38 and extending in a clockwise direction around to a point spaced slightly in the counterclockwise direction from the left-hand nozzle aperture 27. The intake coupling, from the exterior of the ring 24 to the interior thereof, is provided by a plurality (thirty-seven in number, for example) of radially-extending holes 41 which are ¼-inch in diameter, for example, and are drilled entirely through ring 24, in the radial direction, the center lines of these holes all lying in a common vertical plane which is the axial midplane of ring 24 (see FIG. 7). The total angle subtended by the array of holes 41 is such that a vertical center line of ring 24 coincides with the center line of one of the holes, and there are fourteen holes to the right or counterclockwise from this center line, and twenty-two holes to the left or clockwise from this center line. It will be realized that each of the holes 41 provides a port which extends entirely through ring 24, in a radial direction. At the radially inner end of the holes 41, some material is cut out of the port ring 24 to provide narrow (and shallow, about ¼-inch deep) slots 72 (see FIG. 7) between adjacent holes 41; slots 72 provide some degree of communication between adjacent holes 41, at the radially inner ends of these holes. The slots 72 are "staggered," in that successive (i.e., adjacent) slots are on opposite sides of the vertical midplane of ring 24.

At the radially inner end of each of the holes 41, the material of the ring 24 is filed away to "square off" the end of each hole, so that at its radially inner end each of the holes 41 has a cross-section in the form of a square, ¼-inch on each side (see FIG. 7). The holes 41 are arranged in groups which are separated to leave between each pair of adjacent groups a respective mounting block 42. The first such group (clockwise from pocket 38) consists of two holes, and then (in the clockwise direction in FIG. 4) there are seven groups each consisting of five holes. A pocket 43 is cut into the inner surface of ring 24, one end of this pocket being closed and the other end thereof opening into the first (i.e., the most counterclockwise in FIG. 4) one of the holes 41.

The radially inner end of each of the mounting blocks 42 is cut away for a small distance (⅜ inch outwardly from the radially inner face of ring 24, by way of example) to leave a passageway 44 which provides communication between the two holes 41 which are on opposite sides of each respective block.

An intake manifold 45 surrounds the intake portion of ring 24, the chamber of this manifold communicating with the radially outer ends of all of the holes or ports 41. Intake manifold 45 comprises an arcuate housing, U-shaped in cross-section (see FIG. 5), providing a single arcuate chamber 46 which communicates at its top or radially inner end with the holes 41, which is closed at one end by an end wall 47 extending from the bottom wall of the U closely adjacent to line 7 and approximately parallel to the outer surface thereof, and which is closed at the other end by an end wall 48 extending from the bottom wall of the U closely adjacent to the left-hand one of the housings 31. By way of example, the (radial) height of the intake manifold housing may be two inches. The manifold 45 is mounted on ring 24, in such a position that chamber 46 is sealed (by means of end walls 47 and 48, and by means of the sides of the U) to the outer face of this ring, by means of seven machine screws 49. The head of each screw 49 bears against the bottom wall or base of the U, and each screw passes through this wall and radially through chamber 46 and threads into a radially-extending tapped hole provided in a respective mounting block 42. A gasket 50, for example a soft copper ring, is utilized under the head of each respective screw 49, the screw holes in manifold 45 each being countersunk to accommodate such gaskets.

The reactant material is supplied to intake manifold 45 by means of four feed lines 1, which are manifolded into the single chamber 46. These lines 1 are spaced 30° apart along the arc of manifold 45 and, as shown in FIG. 5, the ends of the lines are sealed through the front one of the sides of the U, at the bottom of this side. Lines 1 extend away from manifold 45 in a direction substantially at right angles to the sides of the U.

The gaseous reactant material is fed by lines 1 to the intake manifold 45, from the chamber 46 of which it can travel via the holes or ports 41 to the interior of port ring 24.

The exhaust (or product removal) portion of the port ring, like the intake portion just described, utilizes a plurality of small passages (in the form of radially-extending holes drilled through the ring) whose outer ends are coupled together, outside of the ring, by means of a manifold.

The exhaust portion of the port ring (to which the product removal line 14, FIG. 1, is coupled) may be considered as beginning at a point somewhat (angularly) clockwise (viewed in FIG. 4) from pocket 38' and extending in a clockwise direction around to a point spaced considerably in the counterclockwise direction from the right-hand nozzle aperture 27. The exhaust coupling, from the interior of the ring 24 to the exterior thereof, is (assuming that none of the radially-extending holes are selectively closed or plugged, in a manner to be described hereinafter) provided by a plurality (twenty-five in number, for example) of radially-extending holes 51 which are ¼-inch in diameter, for example, and are drilled entirely through ring 24, in the radial direction, the center lines of these holes all lying in a common vertical plane which is located centrally of the axial length of ring 24 (see FIG. 9). The total angle subtended by the array of holes 51 is such that the array is symmetrical about a vertical center line of ring 24. It will be realized that each of the holes 51 provides a port which extends entirely through ring 24, in a radial direction. At the radially inner ends of the holes 51, some material is cut out of the port ring 24 to provide narrow (and shallow, about ¼-inch deep) slots 73 (see FIG. 9) between adjacent holes 51; slots 73 provide some degree of communication between adjacent holes 51, at the radially inner ends of these holes. The slots 73 are "staggered," in that successive (i.e., adjacent) slots are on opposite sides of the vertical midplane of ring 24.

Figure 9:
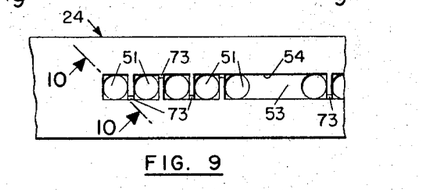
FIG. 9 is a view somewhat similar to FIG. 7 but looking in the direction of arrows 9—9 in FIG. 8.

At the radially inner end of each of the holes 51, the material of the ring 24 is filed away to "square off" the end of each hole, so that at its radially inner end each of the holes 51 has a cross-section in the form of a square, ¼-inch on each side (see FIGS. 9 and 10).

At its radially outer end, each of the holes 51 is countersunk as at 52 (see FIGS. 8 and 10) to form a seat for a valve stem (which will be described hereinafter, and which may be used to close off or plug selected ones of the holes 51).

The holes 51 are arranged in five groups of five holes each, the groups being separated to leave between each pair of adjacent groups a respective mounting block 53. The radially inner end of each of the mounting blocks 53 is cut away for a small distance (⅜-inch outwardly from the radially inner face of ring 24, by way of example) to leave a passageway 54 which provides communication between the two holes 51 which are on opposite sides of each respective block.

An exhaust manifold 55 surrounds the exhaust portion of ring 24, the chamber of this manifold communicating with the radially outer ends of all of the holes or ports 51. Exhaust manifold 55 comprises an arcuate housing, shaped like an inverted U in cross-section (see FIG. 5), providing a single arcuate chamber 56 which communicates at its lower or radially inner end with the holes 51, which is closed at one end by an end wall 57 extending from the base (upper wall) of the U in a substantially radial direction, adjacent the most counterclockwise one of the ports 51, and which is closed at the other end by an end wall 58 extending from the base (upper wall) of the U in a substantially radial direction, adjacent the most clockwise one of the ports 51. By way of example, the (radial) height of the exhaust manifold housing may be two inches. The manifold 55 is mounted on ring 24, in such a position that chamber 56 is sealed (by means of end walls 57 and 58, and by means of the sides of the U) to the outer face of this ring, by means of six machine screws 59. The head of each screw 59 bears against the base (upper wall) of the U, and each of the four interior screws (i.e., each of the screws between the two screws at the respective opposite ends of the manifold 55) passes through the base of the U and radially through chamber 56 and threads into a radially-extending tapped hole provided in a respective mounting block 53, see FIG. 6. The two end screws 59 pass in a radial direction through the respective housing end walls 57 and 58 and thread into respective radially-extending tapped holes provided in the body of port ring 24. A gasket 60, for example a soft copper ring, is utilized under the head of each respective screw 59, the screw holes in manifold 55 each being countersunk to accommodate such gaskets.

The gaseous products, together with the unreacted gases, are withdrawn from exhaust manifold 55 by means of three feed lines 14, which are manifolded into the single chamber 56. These lines 14 are spaced 30° apart along the arc of manifold 55 and, as shown in FIG. 5, the ends of the lines are sealed through the rear one of the sides of the U, at the base end of this side. Lines 14 extend away from manifold 55 in a direction substantially at right angles to the sides of the U, and extend to the separation zone 15, see FIG. 1.

The exhaust is from the interior of port ring 24, via holes or ports 51, to the exhaust chamber 56, and thence from the manifold 55 by lines 14 to the separation zone 15.

The utilization of the radially-extending holes 51 in port ring 24 for exhaust, as previously described, described, provides an additional feature which will now be explained. Some of the holes 51 (particularly those at the ends of the array of holes) may be selectively blocked off or plugged, to thereby vary the effective length of the exhaust portion of the port ring, that is, the effective length of the exhaust coupling from the interior of the ring 24 to the exterior thereof. The arrangement which provides for this selective plugging or closing of holes 51 will now be described.

The base (upper wall) of the U of housing 55 (i.e., the radially outer, solid wall of this housing) has therein twenty-five radially-extending tapped and countersunk holes 61, one of these holes 61 being radially aligned with each respective one of the holes 51 in port ring 24. Thus, the center lines of each respective pair of aligned holes 51 and 61 would if extended be collinear, and the holes 61 have exactly the same angular spacing therebetween as do the holes 51.

For selective closing off or plugging of certain ones of the holes 51 (thereby to prevent the passage of gas through such plugged holes), for the purpose of varying the effective length of the exhaust portion of the port ring (or for other purposes), valve stems 62 are utilized. Ten of these stems are illustrated in FIG. 4, in position to block off or plug ten (somewhat scattered ones) of the holes 51. Each valve stem 62 has a threaded shank at its outer end which threads into a selected one of the tapped holes 61, and a head at its inner end which engages the seat 52 of the corresponding (or aligned) port ring hole 51. Thus, each valve stem 62 is threadedly mounted in a manifold hole 61, extends radially through the manifold chamber 56, and seals off or closes the radially outer end of the aligned port ring hole 51. A seal ring 63, made of "half hard" copper, surrounds each of the valve stems 62 and fits in the countersunk outer end of the respective hole 61, and a slotted lock nut 64 threads onto the outer end of the valve stem 62 and bears against ring 63 to effectuate the seal at ring 63. The outer ends of the valve stems are slotted to facilitate tightening of the lock nuts on the stems.

It is often desired to take a sample of the exhaust gases. For this purpose, there is used a straight sampling tube 65 of small diameter, having a length sufficient to extend in a radial direction from a point outside of the engine through chamber 56 and port ring 24 to a point substantially at the interior of the port ring. This tube extends through a selected one of the holes 61 in manifold housing 55 and its corresponding (or aligned) hole 51 in port ring 24. A threaded shank 66, welded or otherwise secured to the outside of tube 65, threads into the selected manifold hole 61 and serves to mount the tube 65 in the desired position. A seal ring 63 surrounds shank 66, and a slotted lock nut 64 is threaded onto the outer end of this shank, and bears against ring 63. The shank 66 has a slot (not shown) at its outer end, to facilitate tightening of the lock nut on shank 66.

Each and every one of the remaining holes 61 (to wit, those holes not occupied by one of the valve stems 62 or by a sampling tube assembly 65, 66) is occupied or filled in by a short machine screw 67 which threads into the respective hole 61 and closes it. A seal ring 63 is utilized under the head of each respective screw 67.

Due to the provision of holes 61 in the exhaust manifold 55, as well as the valve stems 62, one or more sampling tubes 65, and screw plugs 67, a high degree of flexibility is provided. Selected ones of the port ring holes 51 may be plugged by means of the valve stems, and the sampling tube or tubes may be positioned in any desired port ring hole 51. The screws 67 seal the remaining holes 61 and thus prevent escape of gas from exhaust manifold 55 through these holes.

A disc assembly or rotor 68, having an outer diameter such as to fit very closely within port ring 24, is mounted for rotation at a high angular velocity (e.g., 9600 r.p.m.) within port ring 24. If the disc is twelve inches in diameter, this means that the linear velocity at the outer edge of the disc is about 30,000 feet per minute. This disc assembly is mounted for rotation about a horizontal axis which coincides with the longitudinal axis of port ring 24, so that the outer cylindrical surface of the disc rotates just inside the inner cylindrical surface of the stationary port ring. Assuming a clockwise direction of rotation of the disc in FIG. 4, a point on the outer surface of the disc (such as one end of a shock tube or passage carried by the disc) would rotate (during 360° of disc rotation) past the following port ring elements in sequence, starting from a horizontal position: left-hand nozzle 28, recess 32', recess 35', recess 38', the twenty-five holes 51 in sequence, right-hand nozzle 28, recess 32, recess 35, recess 38, recess 43, and the thirty-seven holes 41 in sequence.

The disc assembly comprises two mating disc portions 68a and 68b, both of circular outer configuration, which are sandwiched together and held in assembled relation by means of an outer series of bolts 69 arranged in a circle, and an inner series of bolts 70 arranged in a circle of smaller diameter (see FIG. 5). Bolts 69 pass through disc portion 68b and thread into tapped holes in disc portion 68a. A squared groove is cut into each of the disc portions 68a and 68b, along a diameter thereof, such that when such two portions are assembled together, a channel of square cross-section is formed by the two squared grooves. Prior to assembly of the two disc portions, a tube 71 of square cross-section (¼-inch by ¼-inch, for example) is fitted closely into this channel, to provide a straight elongated shock tube (close to twelve inches in length) which extends diametrically of the disc assembly. Thus, there is provided a passage, in the disc-like rotor 68, which extends transversely to the axis of the rotor and along a diameter of the disc. Tube 71 is open at both ends, and the ends of the tube terminate closely adjacent the inner cylindrical surface of the port ring 24, as shown in FIG. 4. The tube 71 extends transversely to the horizontal axis of rotation of the disc assembly, and as the disc rotates in essentially a vertical plane, the ends of the tube 71 come into communication with the various nozzles, recesses, and holes associated with port ring 24 in the order previously set forth, considering one end of the tube 71 at a time. In FIG. 4, tube 71 is illustrated with its center line in a vertical position, wherein one end of this tube is in communication with one of the exhaust holes 51, and the opposite end of this tube is in communication with one of the intake holes 41. It will be realized, from what has gone before, that the center lines of the various recesses and holes in port ring 24 all lie in a vertical plane.

For further details of the construction of the disc assembly, reference may be had to the copending application, Serial No. 329,729, filed December 11, 1963, and now Patent No. 3,235,341.

A hollow horizontally-extending shaft 74 (see FIG. 5) is mounted for rotation (by means of suitable bearings, not shown) within a fixed housing 75. Housing 75, which may be cylindrical with its axis extending horizontally, provides a support for the wave reactor, and is attached in turn to a bracket or mount which rests on the floor or other supporting surface. Shaft 74 is rotated at a high rate of speed (e.g., 9600 r.p.m.) by a motor (not shown), through a suitable mechanical coupling (also not shown). The heads of bolts 70 engage an integral collar 76 on one end of shaft 74, and these bolts pass through disc portion 68a and thread into tapped holes in disc portion 68b. Thus, bolts 70, in addition to securing the disc portions 68a and 68b together, couple disc assembly 68 to shaft 74, thereby to cause rotation of disc 68 at the same high rate of speed as shaft 74. The shock tube 71, being rigidly mounted in disc assembly 68, rotates at the same high rate of speed as the disc and shaft 74. It may be seen that the disc 68 rotates essentially in a vertical plane, about the horizontal axis provided by shaft 74. The shock tube 71, of course, rotates in this same plane. A labyrinth seal (a portion of which is illustrated at 77) is used around shaft 74. In addition, other seals (not shown) may be utilized, to enhance the overall sealing around shaft 74.

For pressure measurement purposes, an aperture 78 may be provided in the rear wall of tube 71, centrally of the length thereof, and in this aperture a pressure transducer (not shown) may be inserted, to measure the pressure at the center of the shock tube as the latter rotates. The transducer is so constructed that it in effect fills in the aperture 78, and forms a continuation of the tube wall, for gas flow in the shock tube. The pressure transducer leads may be taken off through a conduit 79 which extends through the bore of hollow shaft 74 and one end of which threads into a threaded fitting provided at the center of the rear face of disc assembly 68. Conduit 79, and the pressure transducer also, rotate with disc assembly 68.

A rear cover plate 80, which is more or less disc-shaped, is secured to the rear face 26 of port ring 24. Cover plate 80 is attached in any suitable manner to housing 75, in order to provide a support for the principal stationary parts of the wave reactor (such as the port ring, the intake and exhaust manifolds, etc.). By way of example, three angularly-extending arms (not shown) may be rigidly secured at their ends to housing 75 and plate 80, respectively. For securing cover plate 80 to port ring 24, a circular array of longitudinally-extending tapped holes is provided in ring 24, holes 81 being provided in the mounting blocks 42 and 53, and holes 82 being provided in the body of ring 24. Bolts 83 pass through plate 80 and thread into the respective holes 81 and 82, to secure rear cover plate 80 to port ring 24. Cover plate 80 has a substantially circular opening at its center, of a diameter such as to clear the rotating collar 76. It is pointed out that the axial dimension of disc assembly 68 is appreciably less than that of port ring 24, so that there is clearance space (for rotation of disc 68) between the front or inner face of cover plate 80 and the rear face of disc 68.

The inner end of housing 75 abuts the rear face of cover plate 80, and a seal ring 84 is used to seal the joint between these two elements. Ring 84 carries in its inner cylindrical surface a gasket 85 (for example, an O-ring) which provides a seal against the outer cylindrical surface of housing 75, and carries in its front circular face a gasket 86 (for example, an O-ring) which provides a seal against the rear face of cover plate 80. Seal ring 84 is held in position by a plurality of bolts 87 which pass therethrough and thread into tapped holes provided in cover plate 80.

To enable visual inspection of the shock tube 71 during operation of the reactor, an aperture 88 is provided in the front wall of tube 71, centrally of the length thereof, and in this aperture there is inserted a stepped inner quartz window 89 which is held in position by a threaded bushing 90, this bushing being threaded into a tapped hole provided in disc assembly 68. The inner step of the window 89 in effect fills in the aperture 88, and forms a continuation of the tube wall, for gas flow in the shock tube. Elements 89 and 90 are carried by the disc assembly 68, and rotate therewith.

A front cover plate 91, which is more or less disc-shaped, is secured to the front face 25 of port ring 24. The tapped holes 81 and 82 extend entirely through the mounting blocks and port ring body, respectively. Bolts 92 pass through plate 91 and thread into the respective holes 81 and 82, to secure front cover plate 91 to port ring 24. Plate 91 has a substantially circular opening at its center, of a diameter such as to clear the central hub of rotating disc assembly 68. Since (as previously stated) the axial dimension of disc assembly 68 is less than that of port ring 24, and since the disc is positioned centrally (in the axial direction) of the port ring, there is clearance space (for rotation of disc 68) between the rear or inner face of cover plate 91 and the front face of disc 68.

A disc-shaped window holder 93 has therein a counter-bored central aperture 94 in which is seated an outer quartz window 95. Window holder 93 is secured to the central area of the outer or front face of the stationary cover plate 91, by means of bolts 96 which pass through holder 93 and thread into tapped holes provided in cover plate 91. The center line of window 95 is aligned with the center line of window 89, so that the operator can look from the front of the wave reactor through windows 95 and 89 into the interior of tube 71.

A clamp ring 97 clamps outer window 95 in position against an O-ring seal 98. Clamp ring 97 is secured to window holder 93 by means of bolts 99 which pass through the ring and thread into tapped holes provided in the holder.

Refer again to FIG. 4. A pair of diametrically-opposite vent pipes 100 are sealed through the front cover plate 91, these pipes being centered on a horizontal diameter and being located near the outer periphery of the disc assembly 68. Pipes 100 are welded each to a respective square mounting plate 101 which is in turn secured by bolts 102 to the front cover plate 91. The inner ends of the pipes 100 communicate with the space between the disc 68 and the front cover plate 91, while the outer ends of these pipes vent to the atmosphere. Pipes 100 thus serve to vent the front space inside the housing, which is formed by the cover plates, to the atmosphere.

A pair of vent pipes, similar to pipes 100 but not shown in the drawings, are sealed through the rear cover plate 80, to vent the rear space inside the housing to the atmosphere.

As previously described, the straight open-ended shock tube 71 rotates (in a clockwise direction in FIG. 4) at high angular velocity, essentially in the plane of the paper, about an axis perpendicular to the plane of the paper, the disc rotating within the port ring 24. The ends of the tube 71 (which provides a passage in the disc 68) thus rotate past the various nozzles, holes, and pockets or recesses associated with the port ring 24, as previously described. As the open ends of the tube 71 rotate past the various nozzles, holes, and pockets associated with the port ring 24, these ends of course come into communication with such nozzles, holes, and pockets, in the definite order or succession which was described previously. The action occurring during one complete revolution of the disc 68 and the shock tube 71 will now be described.

As one end of the tube 71 comes into communication with pocket 43 (by rotating past this pocket), process gas begins to flow into this end of the tube, since said pocket (like holes 41) is coupled to the intake manifold 45. This flow continues to take place as this one end of the tube passes the inner ends of the first two holes 41, the first passageway 44, and the following hole 41. Then, as rotation of the tube 71 continues, the other end of the tube rotates past the inner end of the first (most counterclockwise) exhaust hole 51. Discharging of product gases from a previous operation commences via exhaust manifold 55, a flushing action being produced by the continued intake of process gas or reactant material, as said one end of the tube continues to rotate past holes 41 and passageways 44. The discharge or exhaust takes place, of course, via the said other end of the shock tube 71. This process continues as said other end of the tube rotates past holes 51 and passageways 54, until this other end passes the most clockwise hole 51. Of course, no exhaust takes place through those of the holes 51 which are closed off or blocked by valve stems 62. When the said other end of tube 71 passes the sampling tube 65, a sample is taken and fed to a separate sample container.

After the said other end of tube 71 has passed the most clockwise hole 51, the exhaust ceases, but reactant material continues to be fed into said one end of the tube as this one end passes the remaining ones of the holes 41 and passageways 44. The feed continues until said one end of the tube passes the most clockwise hole 41. In this connection, it may be noted that the passageways 44 communicate with the intake manifold 45, and the passageways 54 communicate with the exhaust manifold 55.

Said one end of the shock tube 71 thereafter comes into sudden communication with the interior of the left-hand nozzle 28, and at this same instant said other end of the tube comes into sudden communication with the interior of right-hand nozzle 28. Both ends of the shock tube are thereby suddenly connected to the reservoir of high pressure driving gas (hydrogen). Two shock waves are thereby created, as previously described in connection with FIG. 2. The process gas in the tube is compressed and brought very rapidly to the reaction temperature. The adiabatic compression process is completed by the time the ends of the tube have completed their travel past the nozzles 28.

Said one end of the tube thereafter comes into communication with pocket 32', and simultaneously said other end of the tube comes into communication with pocket 32. Pocket 32' communicates with the left-hand line 5, and pocket 32 with the right-hand line 5. Expansion waves are set up, as previously described in connection with FIG. 3. The first expansion process is completed by the time the ends of the tube have completed their travel past the clockwise ends of the respective recesses or pockets 32' and 32.

Said one end of the tube thereafter comes into communication with pocket 35', and simultaneously said other end of the tube comes into communication with pocket 35. Pocket 35' communicates with the left-hand line 6, and pocket 35 with the right-hand line 6. Expansion waves are again set up, to begin a second expansion process, which latter is completed by the time the ends of the shock tube 71 have completed their travel past the clockwise ends of the respective recesses or pockets 35' and 35.

Said one end of the shock tube thereafter comes into communication with pocket 38', and simultaneously said other end of the tube comes into communication with pocket 38. Pocket 38' communicates with the left-hand line 7, and pocket 38 with the right-hand line 7. Expansion waves are again set up, to begin a third expansion process, which latter is completed by the time the ends of the tube 71 have completed their travel past the clockwise ends of the respective recesses or pockets 38' and 38. At the end of this third expansion process, all the hydrogen has left the tube.

Said other end of the tube thereafter comes into communication with pocket 43, and process gas begins to flow into this end of the tube, this flow continuing to take place throughout the travel of said other end of the tube past the intake holes and passageways 41 and 44. Shortly after the beginning of this intake into said other end of the tube, said one end of the tube rotates past the inner end of the first (most counterclockwise) exhaust hole 51. Discharging of product gases again commences via exhaust manifold 55, a flushing action again being produced by the continued intake of process gas or reactant material as said other end of the tube continues to rotate past holes 41 and passageways 44. The discharge or exhaust now takes place via said one end of tube 71. Discharge and flushing continues as said one end of the tube rotates past holes 51 and passageways 54, until this one end passes the most clockwise hole 51. Feed into said other end of the tube continues after the cessation of exhaust from said one tube end, until said other tube end passes the most clockwise hole 41.

Said one end of the shock tube thereafter comes into sudden communication with the interior of the right-hand nozzle 28, and at this same instant said other end of the tube comes into sudden communication with the interior of left-hand nozzle 28. Two shock waves are again created, bringing the process gas in the tube rapidly to the reaction temperature.

Said one end of the tube thereafter comes into communication with pocket 32, and simultaneously said other end comes into communication with pocket 32'. A first expansion process again takes place, followed by a second expansion process as said one end of the tube comes into communication with pocket 35 and said other end into communication with pocket 35', and then by a third expansion process as said one end of the tube comes into communication with pocket 38 and said other end into communication with pocket 38'. At the end of this third expansion process, all the hydrogen has left the tube.

Now, the tube 71 has rotated through 360° and the action previously described begins to repeat as said one end of the tube again comes into communication with pocket 43. It may be seen that there are actually two intake and two exhaust cycles, and two compression cycles and two expansion cycles, during each 360° of rotation (i.e., during each complete revolution) of the shock tube 71.

The invention claimed is:

1. In a wave reactor, a disc-like rotor having a single straight passage extending transversely to the axis of the rotor and along a diameter of the disc; and a stationary port ring closely surrounding said rotor, said ring having at one side thereof an arcuately-elongated outlet coupling comprising a plurality of closely adjacent holes extending through said ring in a radial direction, the center lines of said holes all lying in a common plane.

2. In a wave reactor, a disc-like rotor having a single straight passage extending transversely to the axis of the rotor and along a diameter of the disc; and a stationary port ring closely surrounding said rotor, said ring having at one side thereof an arcuately-elongated outlet coupling comprising a plurality of closely adjacent holes extending through said ring in a radial direction, the center lines of said holes all lying in a common plane; said ring having at the opposite side thereof an arcuately-elongated inlet coupling.

3. In a wave reactor, a disc-like rotor having a single straight passage extending transversely to the axis of the rotor and along a diameter of the disc; and a stationary port ring closely surrounding said rotor, said ring having at one side thereof an arcuately-elongated outlet coupling comprising a plurality of closely adjacent holes extending through said ring in a radial direction, the center lines of said holes all lying in a common plane; said ring having at the opposite side thereof an arcuately-elongated inlet coupling comprising a plurality of closely adjacent holes extending through said ring in a radial direction, the center lines of said last-mentioned holes all lying in a common plane.

4. In a wave reactor, a disc-like rotor having a single straight passage extending transversely to the axis of the rotor and along a diameter of the disc; a stationary port ring closely surrounding said rotor, and means providing a pair of diametrically-opposite driving gas inlets in said ring; said ring having at one side thereof an arcuately-elongated outlet coupling comprising a plurality of closely adjacent holes extending through said ring in a radial direction, the center lines of said holes all lying in a common plane.

5. In a wave reactor, a disc-like rotor having a single straight passage extending transversely to the axis of the rotor and along a diameter of the disc; a stationary port ring closely surrounding said rotor, and means providing a pair of diametrically-opposite driving gas inlets in said ring, said ring having therein at least one pair of diametrically-opposite driving gas outlets; said ring also having at one side thereof an arcuate-elongated outlet coupling comprising a plurality of closely adjacent holes extending through said ring in a radial direction, the center lines of said holes all lying in a common plane.

6. In a wave reactor, a disc-like rotor having a single straight passage extending transversely to the axis of the rotor and along a diameter of the disc; a stationary port ring closely surrounding said rotor, and means providing a pair of diametrically-opposite driving gas inlets in said ring; said ring having at one side thereof an arcuately-elongated outlet coupling comprising a plurality of closely adjacent holes extending through said ring in a radial direction, the center lines of said holes all lying in a common plane; said ring having at the opposite side thereof an arcuately-elongated inlet coupling.

7. In a wave reactor, a disc-like rotor having a single straight passage extending transversely to the axis of the rotor and along a diameter of the disc; a stationary port ring closely surrounding said rotor, and means providing a pair of diametrically-opposite driving gas inlets in said ring; said ring having at one side thereof an arcuately-elongated outlet coupling comprising a plurality of closely adjacent holes extending through said ring in a radial direction, the center lines of said holes all lying in a common plane; said ring having at the opposite side thereof an arcuately-elongated inlet coupling comprising a plurality of closely adjacent holes extending through said ring in a radial direction, the center lines of said last-mentioned holes all lying in a common plane.

8. In a wave reactor, a disc-like rotor having a single straight passage extending transversely to the axis of the rotor and along a diameter of the disc; a stationary port ring closely surrounding said rotor, and means providing a pair of diametrically-opposite driving gas inlets in said ring, said ring having therein at least one pair of diametrically-opposite driving gas outlets; said ring also having at one side thereof an arcuately-elongated outlet coupling comprising a plurality of closely adjacent holes extending through said ring in a radial direction, the center lines of said holes all lying in a common plane; said ring having at the opposite side thereof an arcuately-elongated inlet coupling.

9. In a wave reactor, a disc-like rotor having a single straight passage extending transversely to the axis of the rotor and along a diameter of the disc; a stationary port ring closely surrounding said rotor, and means providing a pair of diametrically-opposite driving gas inlets in said ring, said ring having therein at least one pair of diametrically-opposite driving gas outlets; said ring also having at one side thereof an arcuately-elongated outlet coupling comprising a plurality of closely adjacent holes extending through said ring in a radial direction, the center lines of said holes all lying in a common plane; said ring having at the opposite side thereof an arcuately-elongated inlet coupling comprising a plurality of closely adjacent holes extending through said ring in a radial direction, the center lines of said last-mentioned holes all lying in a common plane.

10. A wave reactor according to claim 9, wherein said ring has therein a plurality of pairs of diametrically-opposite driving gas outlets.

References Cited by the Examiner

UNITED STATES PATENTS 3,254,960  6/1966  Hansel _______________ 23—252

MORRIS O. WOLK, *Primary Examiner.*

J. H. TAYMAN, *Assistant Examiner.*